Dec. 22, 1931. H. C. REIMER 1,837,484
TEAT CUP CLEANER
Filed Sept. 10, 1930
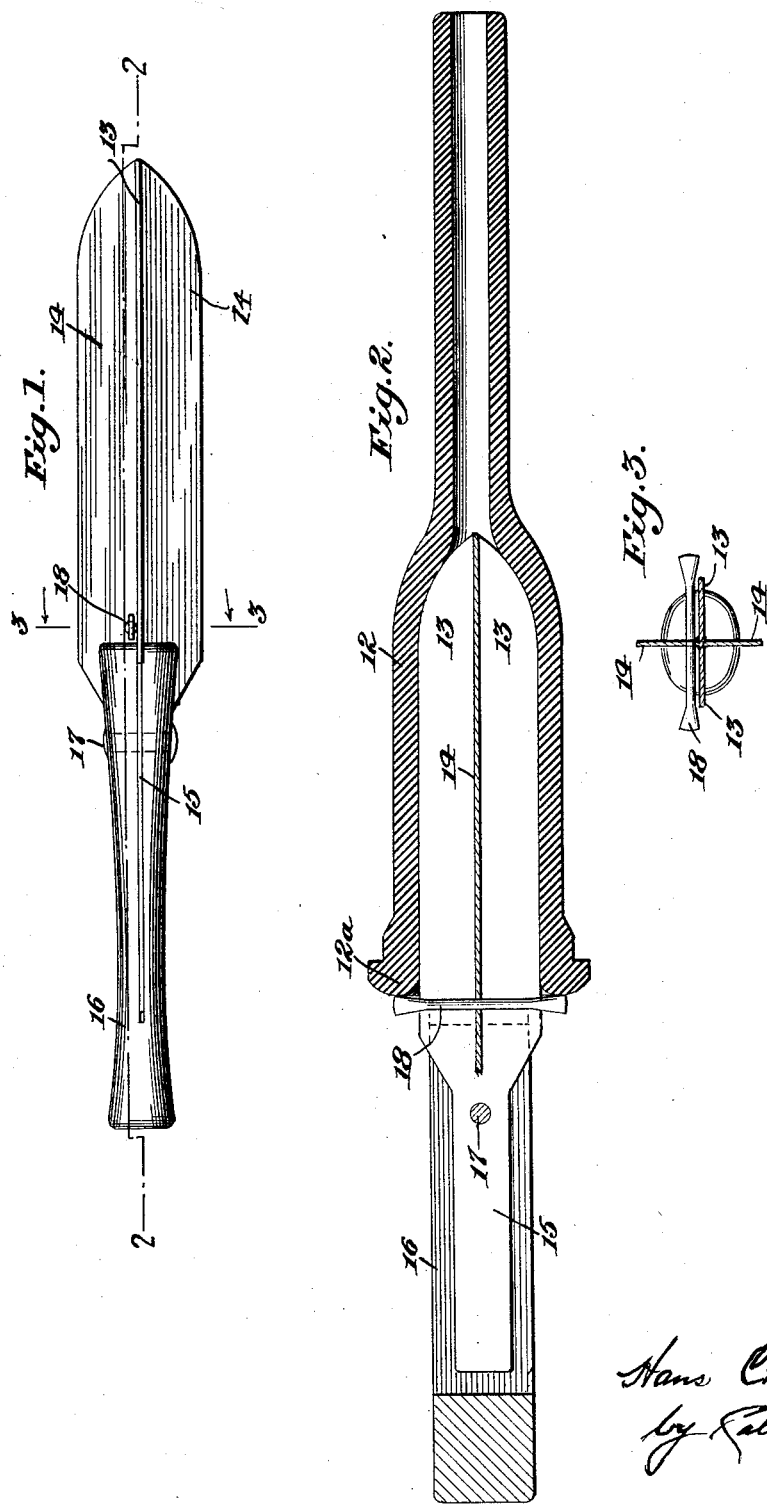

Patented Dec. 22, 1931

1,837,484

UNITED STATES PATENT OFFICE

HANS CHRISTEAN REIMER, OF CAPRON, ILLINOIS

TEAT CUP CLEANER

Application filed September 10, 1930. Serial No. 481,007.

This invention relates to a simple and effective device for cleaning the insides of teat cups of milking-machines so as to remove any impurities or bacteria which might otherwise injure the milk. Thus after a milking machine has been used the teat cups may be readily cleansed for the next milking operation.

In the accompanying drawings Fig. 1 is a side view of the invention, and Fig. 2 is a longitudinal section of the same in connection with a teat cup into which the cleaner is fitted, taken on line 2—2, Fig. 1. Fig. 3 is a cross section on line 3—3, Fig. 1.

Referring to the drawings, 12 denotes a rubber milking-machine teat-cup of well known construction into which is fitted the improved cleaner comprising, in the construction herein shown, four sheet metal radially disposed wings or blades 13 and 14. The wings or blades 13 are integral with a tang 15 extended into a split handle 16, and being secured in place by a rivet 17 extending through the handle. The blades 14 are, in the construction herein shown, soldered onto the blades 13 and are steadied at their inner ends by entering slits in the handle which is preferably of wood. All of these blades 13 and 14 are tapered at their forward or outer ends, the tapering ends being curved to fit the curved tapering portion of the teat cup.

The cleaner is provided, adjacent the handle 16, with a transverse member 18 the ends of which extend beyond the blades 13. This member is adapted to engage the inner part of the enlarged or flanged portion 12ª of the teat cup, and when the cleaner is turned, for a cleansing operation, this transverse member will scrape against the said inner part of the said flanged portion and thus remove any impurities from said part. This transverse member also serves as a stop to limit the insertion of the cleaner into a teat cup.

From the foregoing it will be understood that the invention provides a cleaner of simple construction which may be inserted into a teat cup, and, when turned therein, will scrape out and remove any impurities or bacteria which might otherwise remain in the teat cup and thus injure the milk.

The invention is not to be understood as being limited to the exact construction shown, as a greater or lesser number of the scraping cleaning blades than those herein shown and described might be employed without departing from the scope of the invention as defined by the claims hereunto appended.

Having thus described my invention I claim and desire to secure by Letters Patent:—

1. A milking machine teat-cup cleaner comprising four connected radially disposed and rigidly connected metal blades two of which are arranged at right angles to the other two, and all of which have curved tapering outer ends to fit the curved tapering part of a teat cup, two of said blades having an integral tang, a split and slitted handle into which said tang and the inner ends of the other two blades extend, and means for securing said tang to said handle.

2. A milking machine teat-cup cleaner comprising four connected radially disposed and rigidly connected metal blades two of which are arranged at right angles to the other two, and all of which have curved tapering outer ends to fit the curved tapering part of a teat cup, two of said blades having an integral tang, a split and slitted handle into which said tang and the inner ends of the other two blades extend, means for securing said tang to said handle, and a transverse cleansing member extending beyond said blades adjacent said handle, said member also serving as a stop for limiting the insertion of said cleaner into a teat cup.

In testimony whereof I affix my signature.

HANS CHRISTEAN REIMER.